United States Patent
Britton et al.

(10) Patent No.: US 8,478,862 B2
(45) Date of Patent: Jul. 2, 2013

(54) METHOD AND APPARATUS FOR INTERNET TRAFFIC MONITORING BY THIRD PARTIES USING MONITORING IMPLEMENTS

(75) Inventors: Zachary E. Britton, Tuolumne, CA (US); Derek S. Maxson, Twain Harte, CA (US)

(73) Assignee: Front Porch, Inc., Sonora, CA (US)

( * ) Notice: Subject to any disclaimer, the term of this patent is extended or adjusted under 35 U.S.C. 154(b) by 499 days.

(21) Appl. No.: 11/974,508

(22) Filed: Oct. 12, 2007

(65) Prior Publication Data

US 2009/0019148 A1 Jan. 15, 2009

Related U.S. Application Data

(60) Provisional application No. 60/928,281, filed on Jul. 13, 2007.

(51) Int. Cl.
*G06F 15/173* (2006.01)

(52) U.S. Cl.
USPC .......................................... 709/224; 709/223

(58) Field of Classification Search
USPC ........................................................ 709/224
See application file for complete search history.

(56) References Cited

U.S. PATENT DOCUMENTS

| | | | |
|---|---|---|---|
| 5,761,673 A | 6/1998 | Bookman et al. | |
| 6,233,618 B1 | 5/2001 | Shannon | |
| 6,393,479 B1 | 5/2002 | Glommen et al. | |
| 6,438,125 B1 | 8/2002 | Brothers | |
| 7,003,565 B2 | 2/2006 | Hind et al. | |
| 7,039,699 B1 | 5/2006 | Narin et al. | |
| 7,260,697 B2 | 8/2007 | Okada | |
| 7,509,408 B2 | 3/2009 | Kurita | |
| 7,600,016 B2 | 10/2009 | Bean | |
| 7,620,697 B1 | 11/2009 | Davies | |
| 7,725,926 B1 | 5/2010 | Karp et al. | |
| 7,779,103 B1 | 8/2010 | Fikes et al. | |
| 2001/0032139 A1* | 10/2001 | Debonnett, Jr. | 705/26 |
| 2001/0055274 A1 | 12/2001 | Hegge et al. | |
| 2002/0116531 A1* | 8/2002 | Chu | 709/246 |
| 2002/0120666 A1* | 8/2002 | Landsman et al. | 709/200 |
| 2002/0128925 A1 | 9/2002 | Angeles | |
| 2002/0138331 A1 | 9/2002 | Hosea et al. | |
| 2002/0184364 A1 | 12/2002 | Brebner | |
| 2003/0050863 A1* | 3/2003 | Radwin | 705/27 |

(Continued)

FOREIGN PATENT DOCUMENTS

| | | |
|---|---|---|
| WO | 2009011728 A2 | 1/2009 |
| WO | 2010011449 A1 | 1/2010 |
| WO | 2010138213 A1 | 3/2010 |

OTHER PUBLICATIONS

International Search Report; PCT/US2008/005741; Sep. 5, 2008.

(Continued)

*Primary Examiner* — William Goodchild
(74) *Attorney, Agent, or Firm* — Robroy R. Fawcett

(57) ABSTRACT

Disclosed is an internet traffic monitoring method that includes a network service provider analyzing an HTTP transaction involving an internet user client. The network service provider responds to the HTTP transaction by forwarding, to the internet user client, an interstitial web page including a monitoring implement. After forwarding the interstitial web page to the internet user client, the network service provider forwards web content, originally associated with the HTTP transaction, to the internet user client.

21 Claims, 8 Drawing Sheets

U.S. PATENT DOCUMENTS

| | | |
|---|---|---|
| 2003/0115546 A1 | 6/2003 | Dubey et al. |
| 2003/0182583 A1 | 9/2003 | Turco |
| 2004/0015600 A1 | 1/2004 | Tiwary et al. |
| 2004/0073533 A1 | 4/2004 | Mynarski et al. |
| 2004/0122943 A1* | 6/2004 | Error et al. ............ 709/224 |
| 2005/0015429 A1 | 1/2005 | Ashley et al. |
| 2005/0033641 A1 | 2/2005 | Jha et al. |
| 2005/0144073 A1 | 6/2005 | Morrisroe et al. |
| 2005/0216421 A1 | 9/2005 | Barry et al. |
| 2005/0216844 A1 | 9/2005 | Error et al. |
| 2005/0238000 A1 | 10/2005 | Pollock et al. |
| 2005/0257250 A1 | 11/2005 | Mitchell et al. |
| 2006/0136372 A1* | 6/2006 | Schunemann ............ 707/2 |
| 2006/0136524 A1 | 6/2006 | Wohlers et al. |
| 2006/0174327 A1 | 8/2006 | Song et al. |
| 2006/0288096 A1 | 12/2006 | Yim |
| 2007/0143829 A1 | 6/2007 | Hinton et al. |
| 2007/0204223 A1 | 8/2007 | Bartels et al. |
| 2007/0245137 A1 | 10/2007 | Bhagat et al. |
| 2008/0004958 A1* | 1/2008 | Ralph et al. ............ 705/14 |
| 2008/0005782 A1 | 1/2008 | Aziz |
| 2008/0040224 A1 | 2/2008 | Roker |
| 2008/0052392 A1* | 2/2008 | Webster et al. ........... 709/224 |
| 2008/0101225 A1 | 5/2008 | Tassinari et al. |
| 2008/0126446 A1 | 5/2008 | Brunet et al. |
| 2008/0126567 A1 | 5/2008 | Wilson |
| 2008/0201331 A1 | 8/2008 | Eriksen et al. |
| 2008/0222283 A1 | 9/2008 | Ertugrul et al. |
| 2009/0030774 A1 | 1/2009 | Rothschild et al. |
| 2009/0037579 A1 | 2/2009 | Error et al. |
| 2009/0077163 A1 | 3/2009 | Ertugrul et al. |
| 2009/0080421 A1 | 3/2009 | Ou |
| 2009/0099931 A1 | 4/2009 | Aaltonen et al. |
| 2009/0113532 A1 | 4/2009 | Lapidous |
| 2009/0157875 A1 | 6/2009 | Britton et al. |
| 2009/0177771 A1 | 7/2009 | Britton et al. |
| 2009/0216882 A1 | 8/2009 | Britton et al. |
| 2009/0254971 A1 | 10/2009 | Herz et al. |
| 2009/0293018 A1 | 11/2009 | Wilson et al. |
| 2010/0024032 A1 | 1/2010 | Britton et al. |
| 2010/0306052 A1 | 12/2010 | Britton et al. |

OTHER PUBLICATIONS

Written Opinion of International Search Report; PCT/US2008/005741; Sep. 5, 2008.

International Search Report; PCT/US2010/020670; Mar. 9, 2010.

Written Opinion of International Search Report; PCT/US2010/020670; Mar. 9, 2010.

Written Opinion of International Search Report; PCT/US2009/047709; Jul. 31, 2009.

Supplementary European Search Report, Application No. EP 08767549.2 (PCT/US2008/005741), Dec. 6, 2011, 7 pages, European Patent Office, Munich, Germany.

* cited by examiner

| User | Participate in Tracking? | Location | Attribute |
|---|---|---|---|
| Juan Smith | Yes | Los Angeles, CA | Wifi |
| Sally Rodriguez | No | New York, NY | |
| 12.123.25.25 | No | Sacramento, CA | |
| 00-13-AA-BB-CC | Yes | | |
| 000130-26-58396-3268 | Yes | | |
| Jen Perla | Yes | Miami, FL | Wifi |

| Web Page | Eligible for Insertion? |
|---|---|
| www.yahoo.com | Yes |
| www.espn.com | No |
| *.edu | No |
| www.whitehouse.gov | Yes |

| Web Bug Location |
| --- |
| www.adserver1.com/webbug |
| www.adserver2.com/webbug |
| www.adserverN.com/webbug |
| www.itm1.com/webbug |
| www.itm2.com/webbug |
| www.itm3.com/webbug |

FIG. 7

Interstitial Format: ⎯ 700

| | |
|---|---|
| <HTML> | 710 |
| ... | 720 |
| ... | 721 |
| ... | 722 |
| Web Bug 1 | 730 |
| Web Bug 2 | 731 |
| Web Bug 3 | 732 |
| ... | 733 |
| Web Bug N | 734 |
| ... | 735 |
| Call for Original URL | 740 |
| </HTML> | 750 |

HTML Modification Format: ⎯ 705

| | |
|---|---|
| <HTML> | 760 |
| Original Web Page HTML | 770 |
| ... | 771 |
| Web Bug 1 | 780 |
| Web Bug 2 | 781 |
| Web Bug 3 | 782 |
| ... | 783 |
| Web Bug N | 784 |
| ... | 785 |
| </HTML> | 790 |

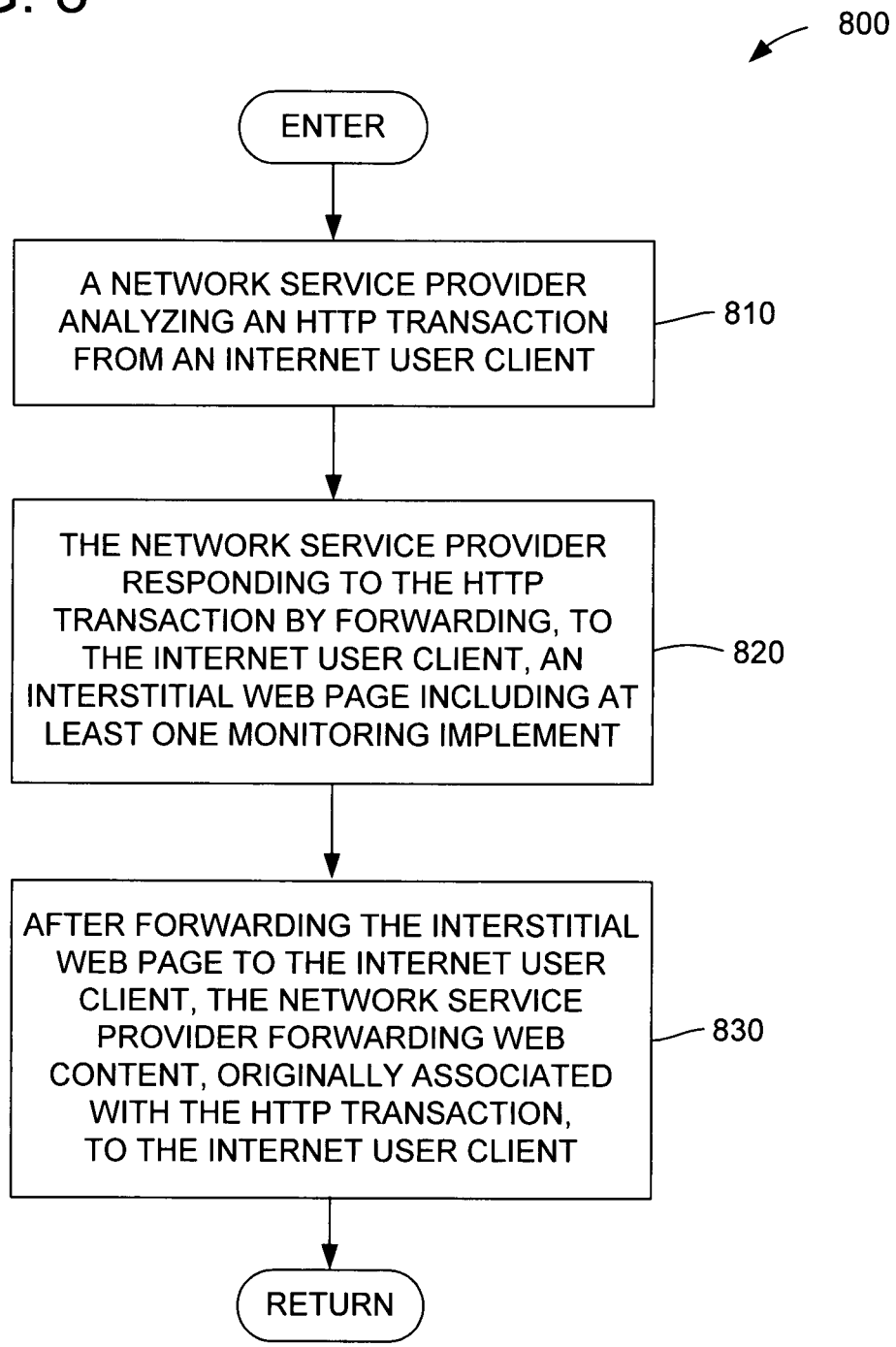

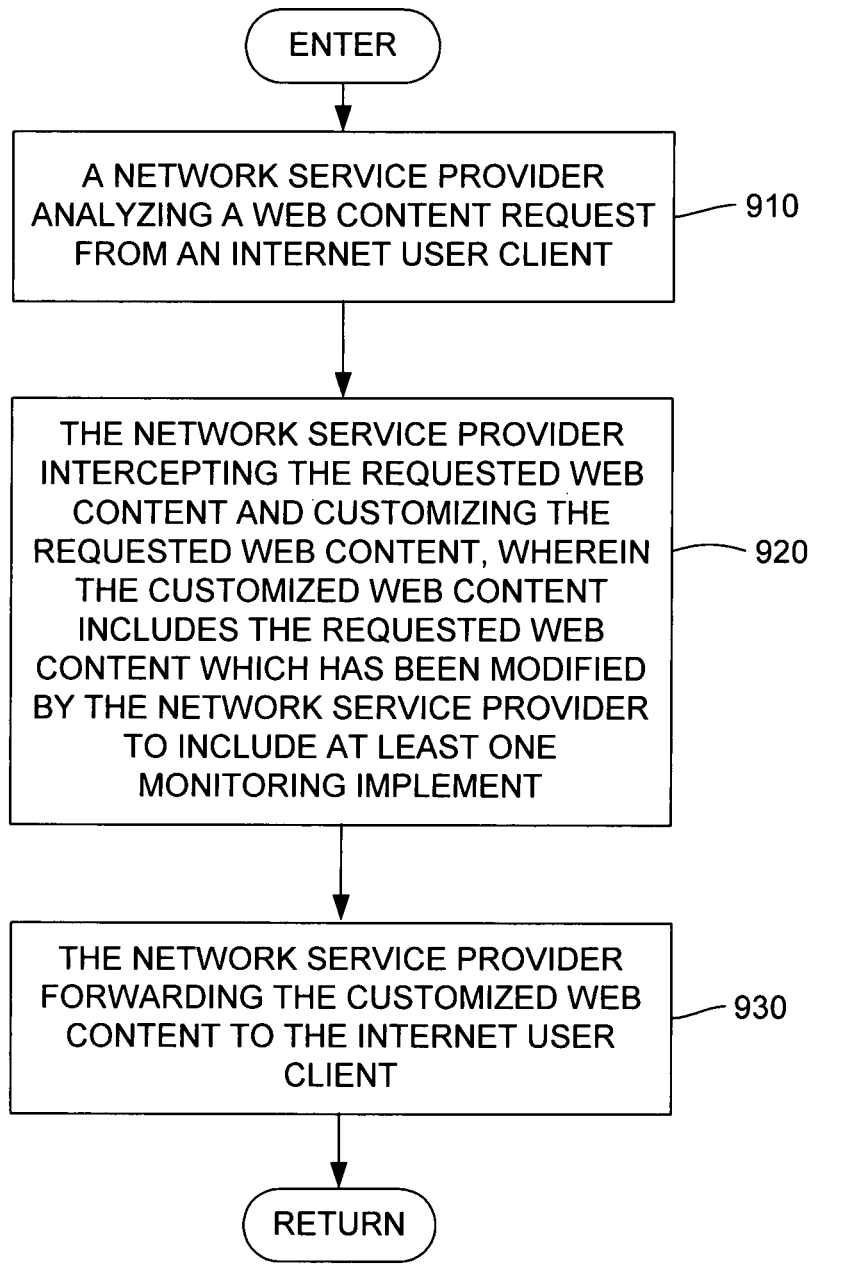

METHOD AND APPARATUS FOR INTERNET TRAFFIC MONITORING BY THIRD PARTIES USING MONITORING IMPLEMENTS

CROSS-REFERENCE TO RELATED APPLICATION

This application claims the benefit of U.S. Provisional Application No. 60/928,281, having an assigned filing date of Jul. 13, 2007, which application is incorporated herein by reference.

BACKGROUND OF THE INVENTION

1. Field of the Invention

The present invention relates to internet traffic monitoring, and more particularly, to a method for using monitoring implements to encompass a wide range of internet traffic.

2. Description of the Prior Art and Related Information

Many Web sites are financially supported by online advertising. Some Web sites sell their own advertisements (ads) and many use, for at least a portion of their advertising inventory, third party ad sales companies known commonly as Advertising Networks (AN). For ease of reference, both types (those who sell their own ads and those who use third party ad sales companies) will be referred herein as ANs. The profitability of many Web sites is chiefly driven by the success, or failure, of the AN at selling the Web sites' ad inventory at the highest possible rate.

Run of Network (RON) advertisements are served indiscriminately to all Internet users who visit Web sites. These RON advertisements tend to earn much lower amounts per ad shown than their more targeted counterparts. This targeting can include location, user interests and other profile data.

To increase the value of the ad inventory, ANs generally use Web bugs and Cookies to track individual users and make it possible to target individual ads. A Web bug may be a small (typically 1×1 pixel) transparent GIF image (or other image of the same color as the background) that is embedded in an HTML page, such as a Web page. When a Web page is opened, the Web bug image is downloaded from the server storing it, allowing for monitoring of the Web page's viewing or usage. A Web bug may also use the HTML, iframe, style, script, input link, embed, object or other tags to track usage.

When an Internet user navigates to a Web page that has ad inventory under AN management, the AN serves a Web bug. While a Web bug on an individual page has limited utility, ANs that have relationships with large numbers of Web sites can serve their Web bugs on many Web sites. By cross-referencing the traffic from multiple Web sites, the AN can begin profiling the Internet user and provide higher value advertising that is more highly targeted to the individual Internet user's interest. Therefore, a primary concern or goal for many AN is to increase the distribution of their Web bug to as many sites as possible.

Further investigation showed that ANs have largely been left out of the value cycle created by search engines. Search engines are able to derive important profile information from their users' Internet searches. They then monetize this profile information by showing ads that match this profile. For example, someone searching for a hybrid automobile on a search engine could see ads for Toyota Prius® vehicles instead of a relatively low-value RON advertisement. Without the ability to place their Web bug on major search engine sites, AN are unable to tap this valuable profile information.

Finally, the Network Service Providers (NSP), such as ISPs, corporations, educational institutions, municipal wireless networks, etc., are not able to monetize their users' valuable profile information. While they may know the location of their users, they are unable to easily provide this information to AN. Moreover, many NSPs do not profile their users' traffic and thus are not able to provide this information to AN.

Attempts to bridge the gap between AN and NSPs have typically fallen into two categories: 1) Swapping out RON ads with more targeted ads, or 2) modifying Web requests made to AN to include additional profile information that will enable the AN to serve more targeted advertisements. Both approaches require the use of a device, such as a proxy server, or its equivalent, to modify the HTTP request to enable the switching of the original Web requests to AN. Moreover, both approaches require some sort of monitoring of the NSP's user traffic. Two major problems of these approaches are that they require extensive NSP monitoring and, perhaps even more difficult, require detailed technical interaction between NSPs and AN.

Internet Traffic Measurement (ITM) companies face a different challenge. Companies such as Nielsen Net Ratings have client-side monitoring software installed on thousands of computers so that they can derive statistics that can be applied to the Internet populace in general in order to understand global trends. Other ITM companies, such as Hitwise, have devices installed at central points on the Internet in order to gather data for the development of trend information. Such solutions use the data to find broad trends rather than individual behavioral data about Internet users and thus are unable to provide specific criteria for the placement of targeted content and advertising. Other ITM companies have other approaches, but use relatively small samples to represent the much larger Internet population.

There is, therefore, a need for a method and apparatus which enables AN or ITM companies to more easily monitor Web traffic generated by users surfing on the Internet via NSPs and to effectively communicate this data to the ANs. The present invention provides the methods and apparatuses to meet these needs.

SUMMARY OF THE INVENTION

The present invention may be embodied in an internet traffic monitoring method that includes a network service provider analyzing an HTTP transaction involving an internet user client. The network service provider responds to the HTTP transaction by forwarding, to the internet user client, an interstitial web page including at least one request monitoring implement. After forwarding the interstitial web page to the internet user client, the network service provider forwards the web content, originally associated with the HTTP transaction, to the internet user client.

In more detailed features of the invention, the HTTP transaction may involve a web content request that may include search terms directed to an internet search engine, and the monitoring implement may cause the internet user client to forward the search terms to an associated advertisement selection service. Further, the interstitial web page may include at least two monitoring implements which each may be associated with a separate advertisement selection service. The monitoring implements may include multiple web bugs (or cookies). Each web bug may be referenced with a URL having embedded parameters related to the user associated with the internet user client.

In other more detailed features of the invention, an advertisement selection service may select targeted advertising web content for presentation by the internet user client based on at least one parameter from a monitoring implement of the network service provider, and based on at least one parameter from a monitoring implement of another network service provider.

The present invention also may be embodied in an internet traffic monitoring system for a network service provider. The system may have means for performing the method steps. Alternatively, the present invention may be embodied in computer program product having computer readable medium including code for causing a computer to perform the method steps.

Additionally, the present invention may be embodied in an internet traffic monitoring method that includes a network service provider analyzing a web content request from an internet user client. The network service provider intercepts the requested web content, and customizes the requested web content. The customized web content includes the requested web content which has been modified by the network service provider to include at least one monitoring implement. The network service provider forwards the customized web content to the internet user client.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings in which:

FIG. 3 depicts an exemplary user database for the present invention.

FIG. 4 depicts an exemplary Web page database for the present invention.

FIG. 6 depicts an exemplary Web bug database.

FIG. 7 depicts exemplary HTML code to insert Web bugs.

FIG. 8 depicts a flowchart illustrating an embodiment of an internet traffic monitoring method, according to the present invention.

FIG. 9 depicts a flowchart illustrating another embodiment of an internet traffic monitoring method, according to the present invention.

DETAILED DESCRIPTION

Figure 1:
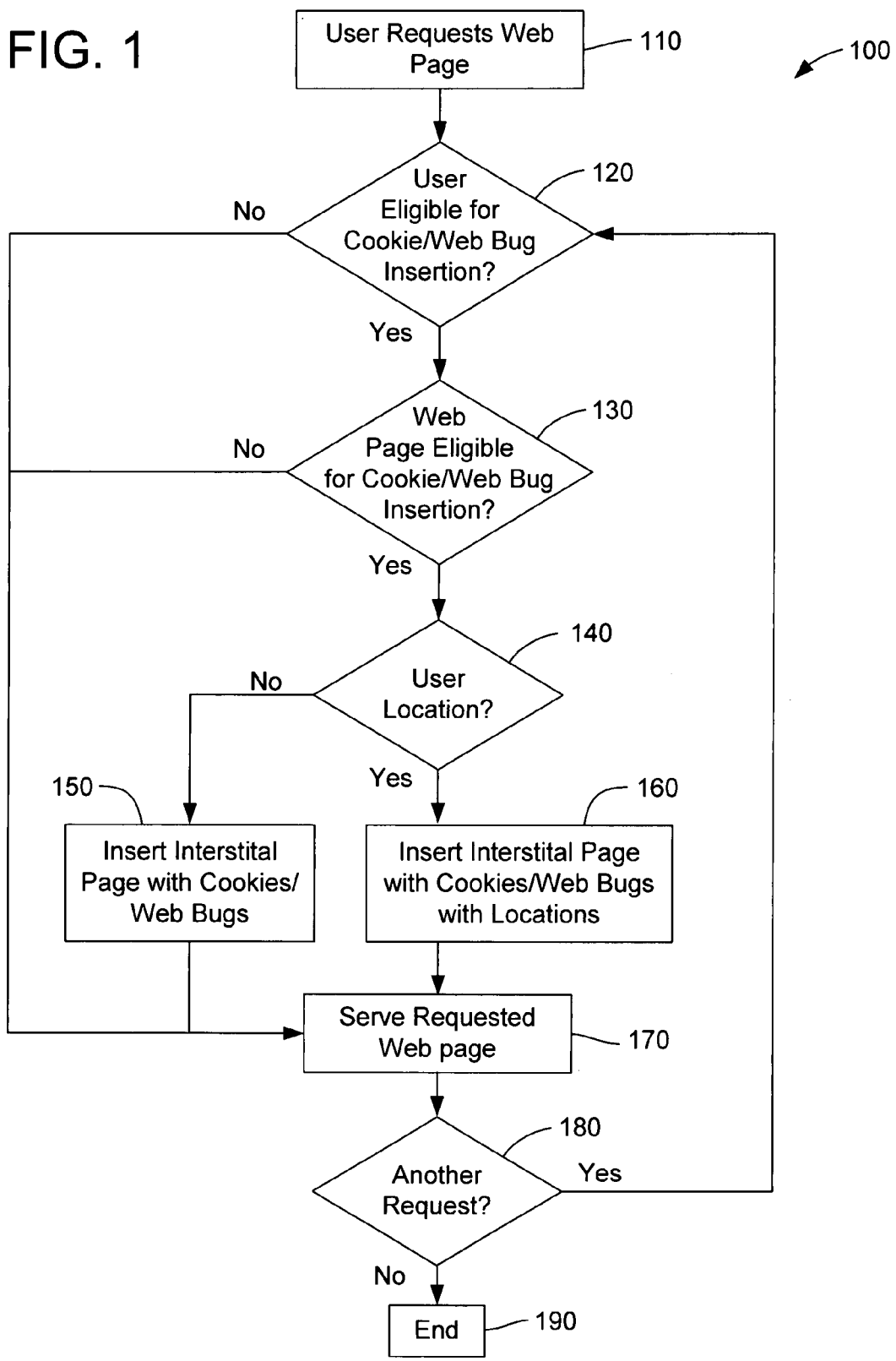
FIG. 1 depicts a flowchart illustrating the process of inserting web bugs or other tracking tools, in accordance with the present invention.

To address the shortcomings of the prior art, the present invention provides a new method for Advertising Networks (AN) and Internet Traffic Measurement (ITM) companies to receive user web traffic data from Network Service Providers (NSPs). Web bugs may be used by AN and ITM companies to track the Web traffic activity of all the users from given NSPs rather than just small subsets. Many ANs use a series of channels and each web bug is the indicator that one or more criteria used in targeting advertising has been observed. Therefore, an advantageous function of the internet traffic monitoring technique of the invention may be to convert raw behavior into a series of single web bug transactions.

The present invention enables NSPs to create and insert and/or modify web pages with AN and ITM Web bugs into their users' Web surfing sessions. The invention is placed on the NSP's network so that it can intercept an HTTP transaction, such as a Web page request, made by a user and either replace it with a customized Web page that includes Web bugs from participating AN and ITM companies, or modify the content of the web request to insert the necessary Web bugs from the participating AN and ITM companies. These modifications or replacements may be made to any objects including HTML, javascript, flash, images, audio, video or other media that are commonly served using the HTTP protocol. The originally requested Web page is then shown. In its simplest form, the customized Web page only provides the Web bugs with URL data from the originally requested Web page. In a more complex installation, it also modifies the URL, cookie, post, or query string, to include location and other information that the NSP knows about the user. In all cases, the inserted Web page is transparent to the user. The HTTP transaction may be intercepted during the request or response for the best effect.

The invention enables a NSP to elect to have only a portion of its users eligible for Web bug insertion. The NSP could, for example, opt to have only users accessing the Internet for free or at a discounted price be eligible for the Web bug insertion. The user database would then be updated per the grouping selected by the NSP.

After a user makes a Web page request, and the database shows that the user is eligible for Web bug insertion, then the Web page database is referenced to ascertain whether the requested web page is eligible for Web bugs. By only inserting Web bugs on certain pages, the NSP can minimize any induced latency caused by the insertion process. For example, a NSP could opt to only serve customized Web pages with Web bugs when the originally requested Web page was for a search engine.

If the user is eligible and the Web page is eligible, then the invention references the user database again to see if location data or other user attributes are known. If they are, then the customized Web page URL appends these parameters to the URL in order to transmit the information to the AN and ITMs via their respective Web bugs.

The inserted Web page then forwards the user to the originally requested Web page. This inserted page is invisible to the user and should only induce nominal latency before the originally requested page is shown. The process will repeat itself for each Web page request that the user makes.

Also note that other companies could utilize their Web bugs in much the same fashion as the AN and ITM companies. For example, media companies could use Web bugs to determine what content would be of most interest to surfers who visit their Web sites.

The present invention relates generally to creating and inserting a web page with web bugs into the stream of web pages viewed by web users so that advertising networks and other third parties can extend the use and utility of their traffic monitoring tools to encompass a much wider range of web traffic.

FIG. 1 depicts a flowchart illustrating the process 100 of inserting Web bugs or other tracking tools, in accordance with the present invention. In describing FIG. 1, it is assumed that: 1) The Internet user is connected to the Internet through a Network Service Provider (as shown in FIG. 2) that utilizes the invention; and 2) One or more advertising networks (AN), traffic measurement servers, or other servers utilizing web bugs or other tracking tools (as shown in FIG. 2, 240.1-241) are participating.

Figure 2:
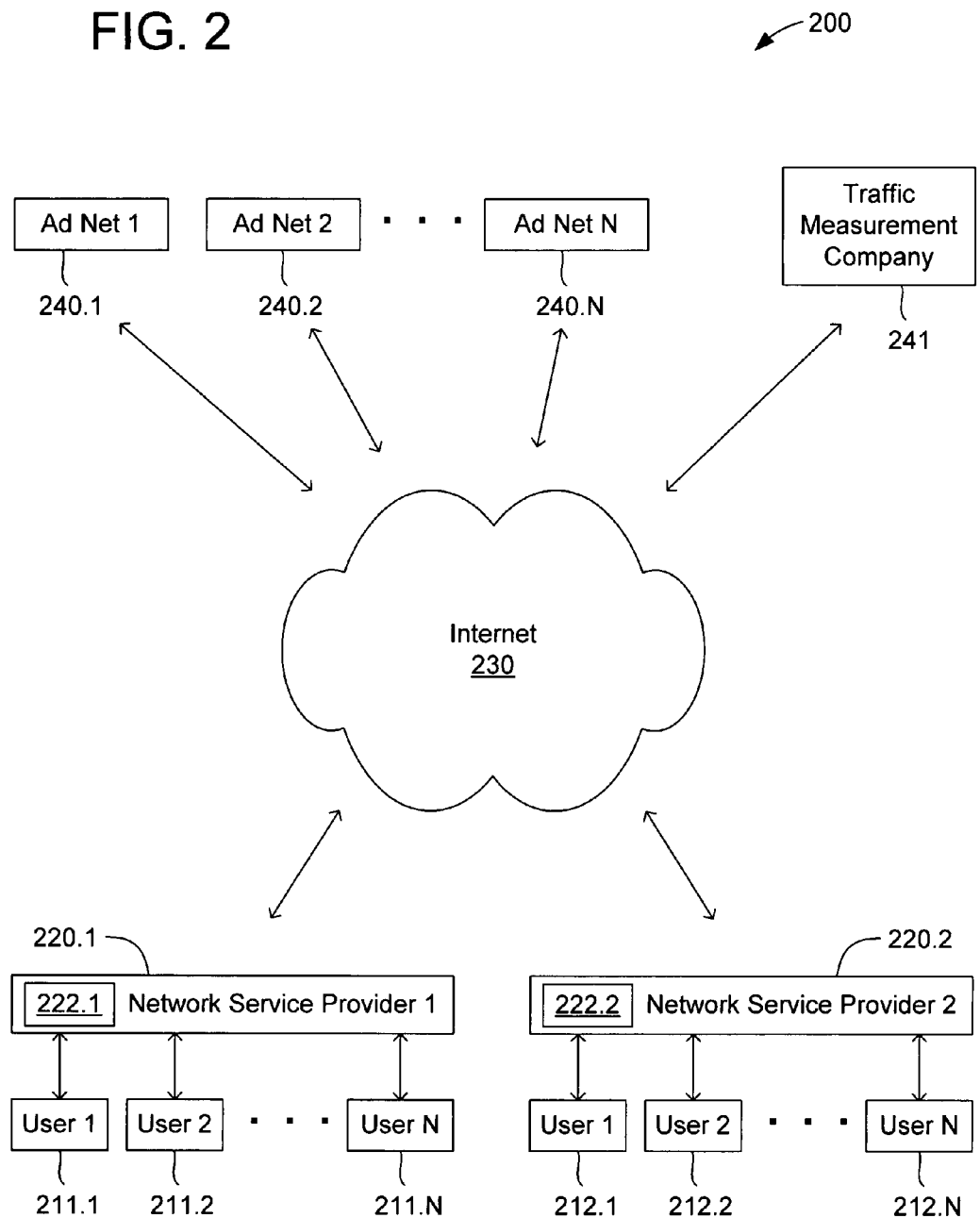
FIG. 2 depicts an exemplary network system, in which the present invention can function.

In FIG. 1 the Internet user (which can be any one of the users shown in FIG. 2, 211.1 212.N) first establishes an Internet connection through a Network Service Provider (as shown in FIG. 2, 220.1 and 220.2). At step 110, the Internet user (which can be using any one of the users 211.1-212.N) submits a HTTP (Web site) request.

At step 120, the application checks fields 310 and 320 in database 300, shown in FIG. 3, to see if the user is participating in the tracking. If the user is not participating, the user goes to step 170, and is served the originally requested Web page. If the user is participating in the Web bug insertion, then the user is moved to step 130. Note that steps 120, 130 and 140 can be conducted in alternative order. Also note that a simplified version of the invention can skip any of the steps 120-140 and simply serve interstitial pages with any available location parameters to all users on all pages.

At step 130, the application checks fields 410 and 420 in database 400 to ascertain if the Web page requested in step 110 is a participating Web location. If it is, the user is moved to step 140. If it is not, the user is moved to step 170 and is served the originally requested Web page from step 110.

At step 140, the application checks fields 310 and 330 in database 300 to ascertain if a location parameter is known for the user. If it is, the user is moved to step 160. If it is not, the user is moved to step 150.

At step 150, the application inserts a Web page with Web bugs from participating Advertising Networks and Traffic Measurement Companies (FIG. 2, 240.1-241). The user is then moved to step 170.

At step 160, the application inserts a Web page with Web bugs from participating Advertising Networks and Traffic Measurement Companies (FIG. 2, 240.1-241). These Web bugs are modified to include the known location parameter found in FIG. 3, field 330. The user is then moved to step 170.

At step 170, the Web page originally requested by the user in step 110 (or step 180, if this is a subsequent iteration) is served. At step 180, if the user requests another Web page, the user is sent to step 120. If the user does not request another Web page, the session ends (step 190).

At step 190, the user is no longer requesting Web pages and there is no more interaction with the invention.

This flow chart could be modified so that the Web Bugs are inserted directly on the Requested Web Page. In this case, Steps 150 and 160 could be skipped and the Web bugs could be inserted directly onto the originally requested Web page. In such cases, user location and other attribute information would not be transmitted via the Web bugs. Alternatively, a framed Web page could be created with the Web bug inserted into one frame (which could be invisible to the user) and the originally requested Web page content in the other frame.

FIG. 2 depicts a block diagram illustrating an exemplary network 200, which includes one or more Internet users connected to the Internet via network service providers. The web site traffic of these users is monitored by one or more advertising networks and one or more traffic measurement companies via the present invention.

As shown in FIG. 2, the network 200 includes users 211.1-212.N, one or more Network Service Providers 220.1-220.2, the Internet 230, and one or more advertising networks and Traffic Measurement Companies 240.1-241.

FIG. 3 depicts an exemplary user database 300 located at a Network Service Provider (or, alternatively, it can be located off-site on a separate network) (which can be any one of the Network Service Providers 220.1-220.2) for storing user identification and participation information, in accordance with the present invention. Use of this database is optional, as noted in the description of FIG. 1.

The participant database 300 (which runs on a computer system as shown in FIG. 2 has four fields: 1) a Subscriber or User field, 310, containing the username (some NSPs could use this field for the user's IP address, Media Access Control—MAC address, or Global Unique Identifier—GUID, instead of a username); 2) a Participation field, 320, detailing whether the user is participating in the tracking; 3) a Location field, 330 containing the subscriber's location; and 4) an Attribute field, 340, that provides other known user information. The example shown in FIG. 3 uses the Attribute field to inform Advertising Networks and Traffic Measurement Companies (FIG. 2 240.1-241) that the User (FIG. 2, 211.1-212.N) is using wifi to connect to the Internet. Many attribute fields could be used, or none at all, depending upon the implementation of the invention.

FIG. 4 depicts an exemplary Web page database 400 located at a Network Service Provider (or, alternatively, it can be located off-site on a separate network) (which can be any one of the Network Service Providers 220.1-220.2) for storing Web site participation information, in accordance with the present invention. Use of this database is optional, as noted in the description of FIG. 1.

The Web page database 400 (which runs on a computer system as shown in FIG. 2) has two fields: 1) a Web Page field, 410, containing the Web page name; and 2) an Eligibility field, 420, detailing whether the web page is eligible for insert.

Figure 5:
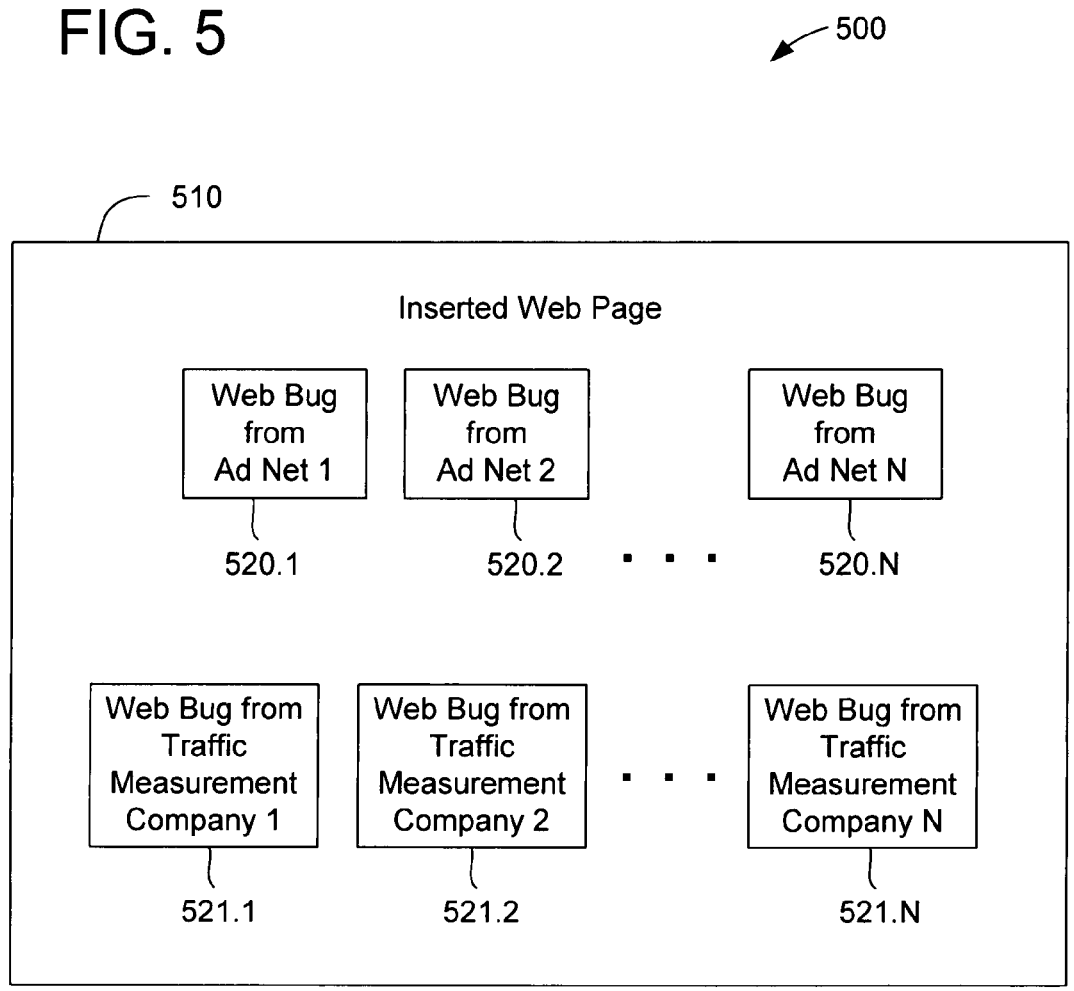
FIG. 5 depicts an exemplary inserted Web page created by the present invention.

FIG. 5 depicts a block diagram illustrating an exemplary inserted Web page 500, which includes Web bugs from one or more AN or ITM companies. As shown in FIG. 5, the inserted Web page 500 includes the Web bugs (FIG. 6, field 610) from one or more AN and ITM companies (FIG. 5, 520.1-521.N). As noted before, the Web bugs could be alternatively inserted directly onto the originally requested Web page or into a frame.

FIG. 6 depicts an exemplary user database 600 located at a NSP (or, alternatively, it can be located off-site on a separate network) (which can be any one of the NSPs 220.1-220.2) for storing the Web bug URL location information for participating AN and ITM companies, in accordance with the present invention. The Web bug location database 600 (which runs on a computer system) has one field: 1) a Web Bug Location field, 610, containing the URL of the Web bug.

FIG. 7 depicts exemplary HTML code for inserting Web bugs onto either an inserted Web page 700 or directly onto the originally requested Web page via a HTML modification format 705. If the NSP opts to insert a Web page with Web bugs, it would follow the steps outlined in FIG. 7 from 710-750. Some of the steps could be taken in a different order than that which is shown below without impacting the overall functionality.

At step 710, the HTML code would begin. At steps 720-722, various Web page elements would be created. At steps 730-734, various Web bugs would be placed on the inserted Web page. At step 735, additional Web page code would be run. At step 740, the originally requested URL would be called and the inserted Web page would disappear. At step 750, the HTML would end.

If the NSP opts to modify the originally requested Web page, either by inserting Web bugs directly into the Web page or by inserting a frame, it would follow steps 760-790. At step 760, the HTML code would begin. At step 770, HTML from the originally requested Web page would be run. At step 771, HTML various Web page elements would be created. At steps 780-784, Web bugs would be inserted onto the originally requested URL by appending this additional HTML code to the originally requested HTML code (step 770). At step 785, further HTML would be inserted as needed to facilitate the Web bug insertion process. At step 790, the HTML would end.

A specific embodiment of the present invention, shown in FIG. 8, may be embodied in an internet traffic monitoring method 800 including a network service provider 220.1-220.2 analyzing a an HTTP transaction, such as a web content request, involving an internet user client 211.1-212.N (step 810), such as a computer having a web browser. The network service provider responds to the HTTP transaction by forwarding, to the internet user client, an interstitial web page 510 including at least one monitoring implement, 520.1-520.N and 521.1-521.N (step 820). At least two monitoring implements may be each associated with a separate advertisement selection service 240.1-240.N and/or 241. After forwarding the interstitial web page to the internet user client, the network service provider forwards the web content, originally associated with the HTTP transaction, to the internet user client (step 830).

A web content request may include search terms directed to an internet search engine, and the monitoring implement may cause the internet user client to forward the search terms to an associated advertisement selection service. The search terms may be used to derive a profile of a user associated with the internet user client. Further, a first monitoring implement may include a first web bug and/or cookie associated with a first advertisement selection service, and a second monitoring implement may include a second web bug and/or cookie associated with a second advertisement selection service. Each web bug may be referenced with a URL having embedded parameters related to the user associated with the internet user client.

An advertisement selection service may select targeted advertising web content for presentation by the internet user client based on at least one parameter, 330 and 340, from a monitoring implement of the network service provider 220.1, and based on at least one parameter from a monitoring implement of another network service provider 220.2.

Another specific embodiment of the present invention may be embodied in an internet traffic monitoring method 900 including a network service provider 220.1-220.2 analyzing a web content request from an internet user client 211.1-212.N (step 910). The network service provider intercepts the requested web content, and customizes the requested web content (step 920). The customized web content includes the requested web content which has been modified by the network service provider to include at least one web content request monitoring implement, 520.1-520.N and 521.1-521.N. The network service provider then forwards the customized web content to the internet user client (step 930).

The present invention enables a NSP to send user information to participating AN and ITMs. This is done by inserting a web page containing web bugs from participating AN and ITMs before showing the originally requested web page. Web bugs on the inserted page capture URL information for the AN (such as an Ad Server AS) who then subsequently can tailor the ads they serve to users' interest as shown by the web pages they select and the searches they make. ITMs could use the invention in a similar fashion to track user web traffic. Common industry practice for web servers is to place their web bugs on many web sites, but with this invention, they can track user web traffic even on sites that don't have the AN's cookies already embedded on the web pages.

The present invention also may be embodied in an internet traffic monitoring system for a network service provider. The system may have means, such as a computer, for performing the method steps. Alternatively, the present invention may be embodied in computer program product having computer readable medium 222.1-222.2 including code for causing a computer to perform the method steps.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. An internet traffic monitoring method, comprising:
a network service provider analyzing a web content request from an internet user client for web content from the internet, wherein the internet user client has a connection to the internet through the network service provider;
the network service provider intercepting the requested web content and customizing the requested web content, wherein the customized web content includes the requested web content which has been modified by the network service provider to include at least a first monitoring implement configured to forward at least one user parameter to a first advertisement selection service, and at least a second monitoring implement configured to forward at least one user parameter to a second advertisement selection service; and the network service provider forwarding the customized web content to the internet user client for causing the internet user client to forward at least one user parameter to the first advertisement selection service based on the first monitoring implement and for causing the internet user client to forward at least one user parameter to the second advertisement selection service based on the second monitoring implement;

wherein the first advertisement selection service selects targeted advertising web content for presentation to the internet user client based on the at least one user parameter forwarded based on the first monitoring implement included in customized web content forwarded by the network service provider, and based on at least one user parameter from monitoring implement included in customized web content forwarded by another network service provider in response to a separate web content request.

2. An internet traffic monitoring method as defined in claim 1, wherein the web content request includes search terms directed to an internet search engine, and wherein each monitoring implement causes the internet user client to forward the search terms to each respective advertisement selection service.

3. An internet traffic monitoring method as defined in claim 1, wherein the first and second monitoring implements comprise at least first and second web bugs.

4. An internet traffic monitoring method as defined in claim 3, wherein the first web bug is referenced with a URL having embedded parameters related to the user associated with the internet user client.

5. An internet traffic monitoring method as defined in claim 1, wherein the first and second monitoring implements comprise at least first and second cookies.

6. An internet traffic monitoring method as defined in claim 1, wherein the first monitoring implement comprises a web bug associated with the first advertisement selection service, and the second monitoring implement comprises a cookie associated with the second advertisement selection service.

7. An internet traffic monitoring method as defined in claim 1, wherein the first advertisement selection service is separate from the second advertisement selection service.

8. An internet traffic monitoring system for a network service provider, comprising:

means for analyzing a web content request from an internet user client for web content from the internet, wherein the internet user client has a connection to the internet through a network service provider;

means for intercepting the requested web content and customizing the requested web content, wherein the customized web content includes the requested web content which has been modified by the network service provider to include at least a first configured to forward at least one user parameter to a first advertisement selection service, and at least a second monitoring implement configured to forward at least one user parameter to a second advertisement selection service; and means for forwarding the customized web content to the internet user client for causing the internet user client to forward at least one user parameter to the first advertisement selection service based on the first monitoring implement and for causing the internet user client to forward at least one user parameter to the second advertisement selection service based on the second monitoring implement;

wherein the first advertisement selection service selects targeted advertising web content for presentation to the internet user client based on the at least one user parameter forwarded based on the first monitoring implement included in customized web content forwarded by the network service provider, and based on at least one user parameter from monitoring implement included in customized web content forwarded by another network service provider in response to a separate web content request.

9. An internet traffic monitoring system as defined in claim 8, wherein the first advertisement selection service is separate from the second advertisement selection service.

10. An internet traffic monitoring system as defined in claim 8, wherein the web content request includes search terms directed to an internet search engine, and wherein each monitoring implement causes the internet user client to forward the search terms to each respective advertisement selection service.

11. An internet traffic monitoring system as defined in claim 8, wherein the first and second monitoring implements comprise at least first and second web bugs.

12. An internet traffic monitoring system as defined in claim 11, wherein the first web bug is referenced with a URL having embedded parameters related to the user associated with the internet user client.

13. An internet traffic monitoring system as defined in claim 8, wherein the first and second monitoring implements comprise at least first and second cookies.

14. An internet traffic monitoring system as defined in claim 8, wherein the first monitoring implement comprises a web bug associated with the first advertisement selection service, and the second monitoring implement comprises a cookie associated with the second advertisement selection service.

15. A computer program product, comprising:
non-transitory computer readable medium including:
code for causing a computer to analyze a web content request from an internet user client for web content from the internet, wherein the internet user client has a connection to the internet through a network service provider;

code for causing a computer to intercept the requested web content and customize the requested web content, wherein the customized web content includes the requested web content which has been modified by the network service provider to include at least a first monitoring implement configured to forward at least one user parameter to a first advertisement selection service, and at least a second monitoring implement configured to forward at least one user parameter to a second advertisement selection service; and code for causing a computer to forward the customized web content to the internet user client for causing the internet user client to forward at least one user parameter to the first advertisement selection service based on the first monitoring implement and for causing the internet user client to forward at least one user parameter to the second advertisement selection service based on the second monitoring implement;

wherein the first advertisement selection service selects targeted advertising web content for presentation to the internet user client based on the at least one user parameter forwarded based on the first monitoring implement included in customized web content forwarded by the network service provider, and based on at least one user parameter from monitoring implement included in customized web content forwarded by another network service provider in response to a separate web content request.

16. A computer program product as defined in claim 15, wherein the first advertisement selection service is separate from the second advertisement selection service.

17. A computer program product as defined in claim 15, wherein the web content request includes search terms directed to an internet search engine, and wherein each monitoring implement causes the internet user client to forward the search terms to each respective advertisement selection service.

18. A computer program product as defined in claim 15, wherein the first and second monitoring implements comprise at least first and second web bugs.

19. A computer program product as defined in claim 18, wherein the first web bug is referenced with a URL having embedded parameters related to the user associated with the internet user client.

20. A computer program product as defined in claim 15, wherein the first and second monitoring implements comprise at least first and second cookies.

21. A computer program product as defined in claim 15, wherein the first monitoring implement comprises a web bug associated with the first advertisement selection service, and the second monitoring implement comprises a cookie associated with the second advertisement selection service.

* * * * *